United States Patent [19]
Ohtake

[11] Patent Number: 5,111,482
[45] Date of Patent: May 5, 1992

[54] MSK SIGNAL DETECTOR
[75] Inventor: Hisao Ohtake, Tokyo, Japan
[73] Assignee: Oki Electric Industry Co. Ltd., Tokyo, Japan
[21] Appl. No.: 492,626
[22] Filed: Mar. 13, 1990
[30] Foreign Application Priority Data
Mar. 14, 1989 [JP] Japan .................. 1-59584
[51] Int. Cl.⁵ .......................................... H04L 27/14
[52] U.S. Cl. ...................................... 375/90; 329/300
[58] Field of Search .............. 375/88, 89, 90, 91, 375/45, 47; 455/205; 329/300, 315; 340/825.58

[56] References Cited
U.S. PATENT DOCUMENTS

| | | | |
|---|---|---|---|
| 4,414,675 | 11/1983 | Comroe | 375/90 |
| 4,485,347 | 11/1984 | Hirasawa et al. | 375/88 |
| 4,551,846 | 11/1985 | Takeda et al. | 329/300 |
| 4,554,665 | 11/1985 | Beesley | 375/90 |
| 4,569,061 | 2/1986 | Breitwisch | 375/90 |
| 4,616,187 | 10/1986 | Watanabe | 375/88 |
| 4,785,255 | 11/1988 | Lucak et al. | 329/300 |

OTHER PUBLICATIONS
R. deBuda, "Coherent Demodulation of Frequency-- Shift Keying with Low Deviation Ratio", *IEEE Transactions on Communications*, vol. com-20, Jun. 1972, 429-435.

*Primary Examiner*—Stephen Chin
*Attorney, Agent, or Firm*—Edward D. Manzo

[57] ABSTRACT

An MSK signal detector uses a limiter to convert an input signal to a signal with only two levels. A transition interval decision and memorizing circuit decides whether intervals between transitions between these levels fall into windows centered at the half-period of the MSK space frequency and the half-period of the MSK mark frequency, or a window centered midway between these two. An MSK decision circuit tests the pattern of decision results to detect patterns corresponding to MSK input. Output from the MSK decision circuit is low-pass filtered and thresholded to produce an MSK detect signal indicating the presence of MSK input. A compact, low-power circuit structure is achievable. The circuit can be adapted for quick preamble detection by simple modifications to the MSK decision circuit and low-pass filter.

21 Claims, 6 Drawing Sheets

MSK SIGNAL DETECTOR

BACKGROUND OF THE INVENTION

This invention relates to an MSK signal detector for detecting the presence or absence of a signal modulated by minimum shift keying (MSK).

Minimum shift keying, which is a type of phase-continuous frequency shift keying (FSK) with a 0.5 modulation index, produces a constant-envelope signal having the advantage of immunity to output amplifier saturation effects, so MSK is coming into use in many types of digital communication equipment. One component of a receiver in such digital communication equipment is an MSK signal detector that detects incoming MSK signals, to prevent malfunctions in next-stage equipment when a noise signal is received.

A prior-art MSK signal detector operates by doubling the frequency of the input signal. If the input signal is an MSK signal, this produces a frequency spectrum with two strong lines, which are extracted by a pair of bandpass filters, further processed by wave folding circuits, and combined in an analog adder. The combined signal is passed through a low-pass filter and thresholded by a comparator which outputs an MSK detect signal. If the input is not an MSK signal, there will be no strong spectral lines for the bandpass filters to extract, the output of the low-pass filter will be below threshold, and the comparator output will indicate that no MSK signal is present.

A disadvantage of the prior-art MSK signal detector is that it uses numerous analog circuits: the bandpass filters, wave folding circuits, adder, low-pass filter, and their attendant operational amplifiers. Integrated onto a semiconductor signal-processing chip, these analog circuits take up excessive space and dissipate excessive power.

SUMMARY OF THE INVENTION

An object of this invention is reduce the use of analog circuits in an MSK signal detector, thereby reducing its size and power dissipation.

A further object is to detect MSK-modulated preamble signals quickly while avoiding false detection due to noise.

An MSK signal detector has a limiter for limiting the amplitude of an input signal and generating a limiter output signal with high and low levels. A transition interval decision and memorizing circuit decides whether intervals between high-to-low and low-to-high transitions of the limiter output signal fall into a first window centered at the half-period of an MSK space frequency, a third window centered at the half-period of an MSK mark frequency, or a second window disposed midway between the first and third windows, and stores the decision results. An MSK decision circuit tests the pattern of decision results and generates an MSK decision signal indicating whether the pattern matches a pattern appearing when the input signal is an MSK signal. A low-pass filter averages the MSK decision signal, and a thresholding circuit generates an MSK detect signal indicating whether the output of the low-pass filter exceeds a threshold value.

A preamble decision circuit can be provided in place of or in addition to the MSK decision circuit to test whether the pattern of decision results matches a pattern appearing when the input signal is an MSK-modulated preamble signal.

BRIEF DESCRIPTION OF THE DRAWINGS

FIG. 2A-FIG. 2K are waveform diagrams illustrating the operation of the first novel MSK signal detector.

FIG. 4L-FIG. 4U are waveform diagrams illustrating the operation of a second novel MSK signal detector.

DETAILED DESCRIPTION OF THE EMBODIMENTS

Three novel MSK signal detectors will be described with references to the drawings. The first novel MSK signal detector is adapted for detecting general MSK signals. The second novel MSK signal detector is adapted for detecting an MSK-modulated preamble signal and providing a quick response. The third novel MSK signal detector incorporates the first and second novel MSK signal detectors.

Figure 1:
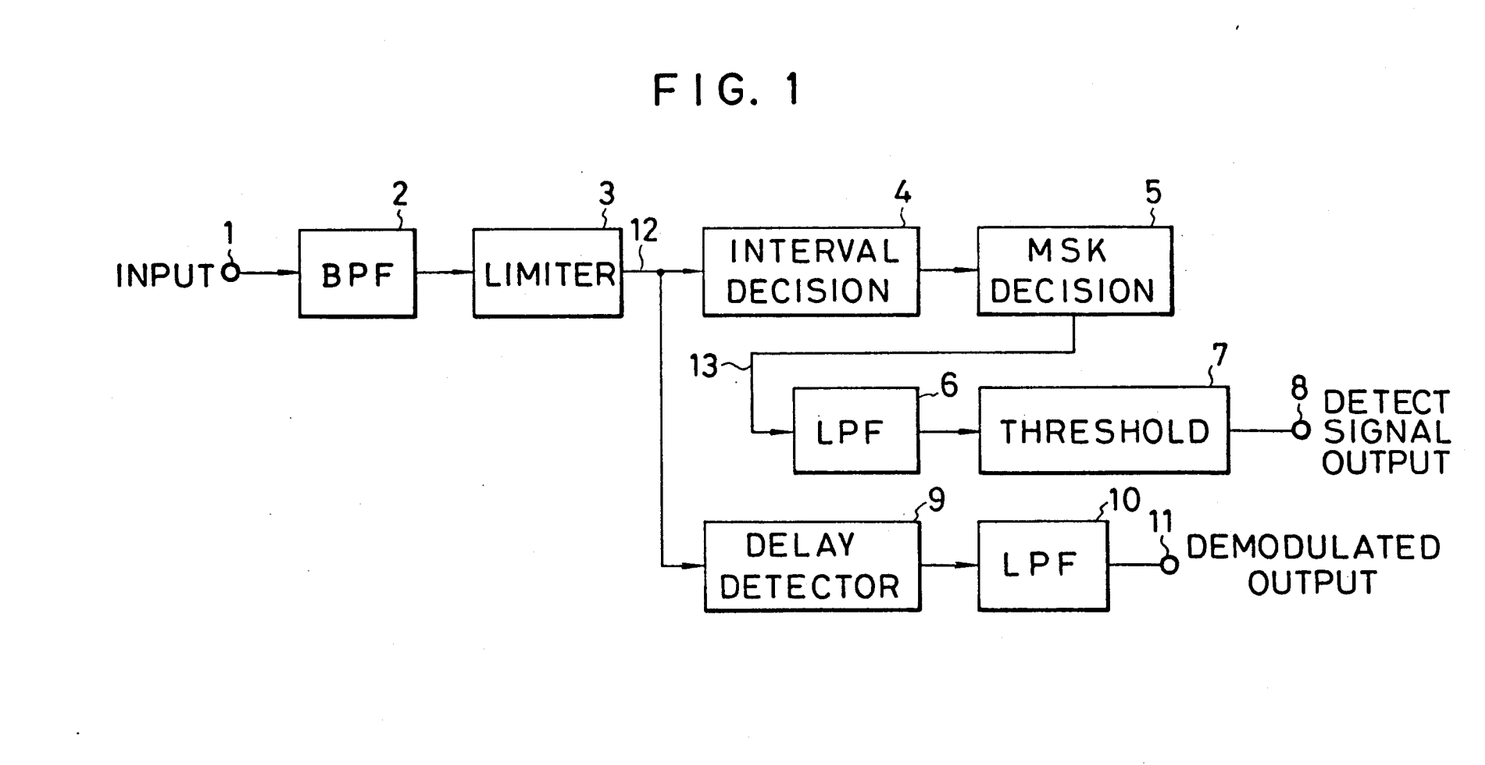
FIG. 1 is a block diagram illustrating a first novel MSK signal detector.

FIG. 1 is a block diagram illustrating the first novel MSK signal detector. An input signal received at an input terminal 1 is passed in series through a bandpass filter (BPF) 2, a limiter 3, a transition interval decision and memorizing circuit 4, an MSK decision circuit 5, a first low-pass filter (LPF) 6, and a thresholding circuit 7 to a first output terminal 8. These elements form the MSK signal detector; the output at the first output terminal 8 is an MSK detect signal indicating whether the input at the input terminal 1 is an MSK signal.

The output of the limiter 3 is also provided to a delay detector 9, the output of which is passed through a third low-pass filter (LPF) 10 to a second output terminal 11. These elements form an MSK demodulator; the output at the second output terminal 11 is the demodulated MSK signal. (The second low-pass filter occurs in the third novel MSK signal detector, and will be described later.)

Particularly identified by reference numerals in FIG. 1 are the limiter output signal 12 generated by the limiter 3, the MSK decision signal 13 output by the MSK decision circuit 5, and the MSK detect signal 14 output at the first output terminal 8.

Figure 2A:
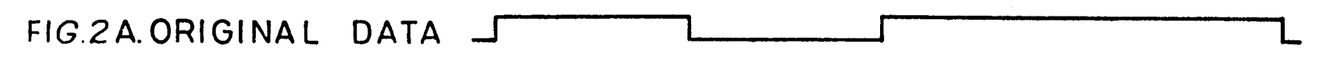
Figure 2B:
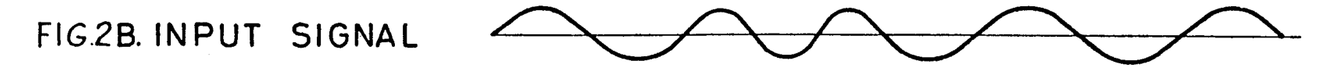
Figures 2C, 2D, 2E, 2F:
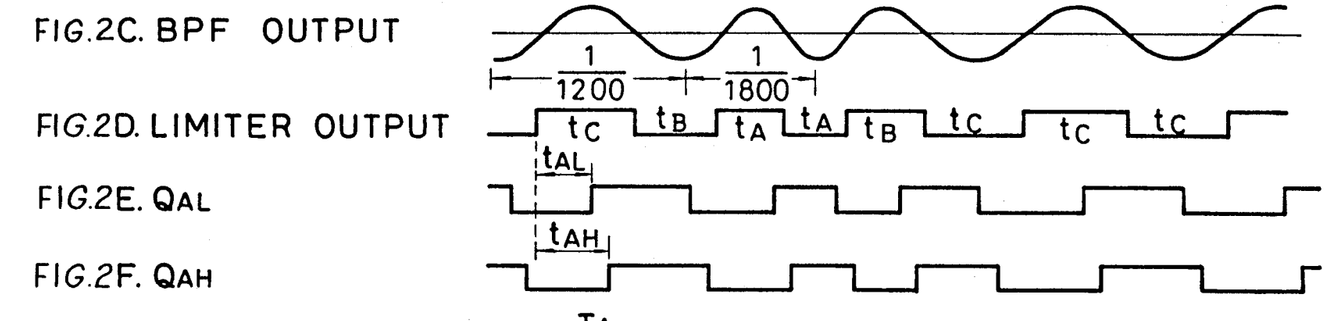
Figure 2G:
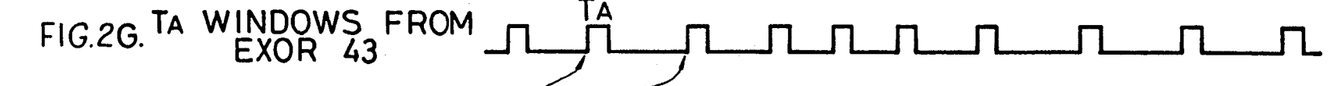
Figure 2H:
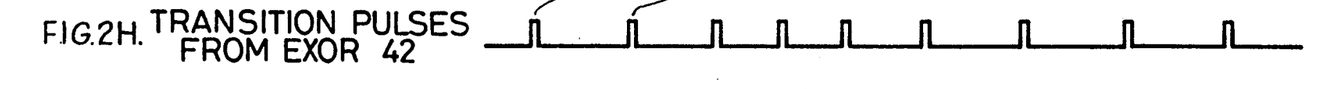
Figure 2I:
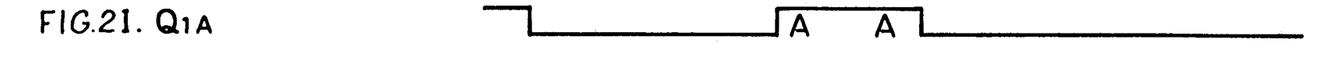
Figure 2J:
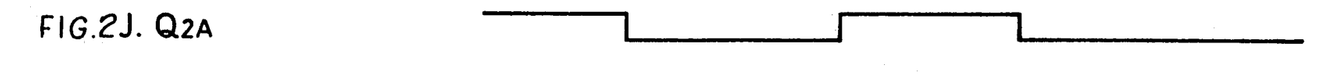
Figure 2K:
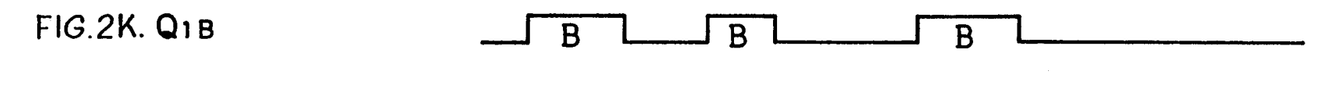

The operation of the MSK signal detector illustrated in FIG. 1 and the functions of its circuit blocks will be explained with reference to waveform diagrams shown in FIG. 2. In the course of this explanation, a more detailed description of the structure of the transition interval decision and memorizing circuit 4 and the MSK decision circuit 5 will be given with reference to FIG. 3.

In FIG. 2, an example of original data is shown at A, comprising the sequence of binary values 1-0-1-1 represented as high-low-high-high, or mark-space-mark-mark. Modulation of a carrier signal according to these data produces an MSK signal, illustrated at B, which arrives at the input terminal 1 in FIG. 1. The BPF 2 extracts the band containing the MSK frequency components, creating the waveform illustrated at C in FIG.

2, which is input to the limiter 3. The limiter 3 limits the amplitude of the input signal, shaping it into a rectangular waveform with only two levels, high and low, as illustrated at D in FIG. 2. The waveform at D is the limiter output signal 12.

In an MSK signal, the intervals between points of high-to-low and low-to-high transition of the limiter output signal 12 have one of three lengths: a time ($t_A$) substantially equal to the half-period of the MSK space frequency $f_S$, occurring when the input represents a space; a time ($t_C$) substantially equal to the half-period of the MSK mark frequency $f_M$, occurring when the input represents a mark; and a time ($t_B$) substantially halfway between $t_A$ and $t_C$, occurring when the input changes between space and mark.

If the bit rate is 1200 bits per second, for example, then as noted in FIG. 2 the space period is 1/1800 s and the mark period is 1/1200 s. In this case $t_A$ is 1/3600 s, $t_C$ is 1/2400 s, and $t_B$ is halfway between $t_A$ and $t_C$.

Since noise may also be present at the input terminal 1, the intervals between transitions may depart somewhat from $t_A$, $t_B$, and $t_C$. Let $t_{AL}$, $t_{BL}$, and $t_{CL}$ be the lower limits of $t_A$, $t_B$, and $t_C$, respectively, at a maximum tolerated signal-to-noise ratio (S/N), and let $t_{AH}$, $t_{BH}$, and $t_{CH}$ be the upper limits. Let $T_A$ represent a window centered at $t_A$, comprising times equal to or greater than $t_{AL}$ and equal to or less than $t_{AH}$. Let $T_B$ represent a window centered at $t_B$, comprising times equal to or greater than $t_{BL}$ and equal to or less than $t_{BH}$. Let $T_C$ represent a window centered at $t_C$, comprising times equal to or greater than $t_{CL}$ and equal to or less than $t_{CH}$. When an MSK signal is received at the input terminal 1, the intervals between transition points in the limiter output signal 12 will normally fall into one of the windows $T_A$, $T_B$, or $T_C$.

Figure 3:
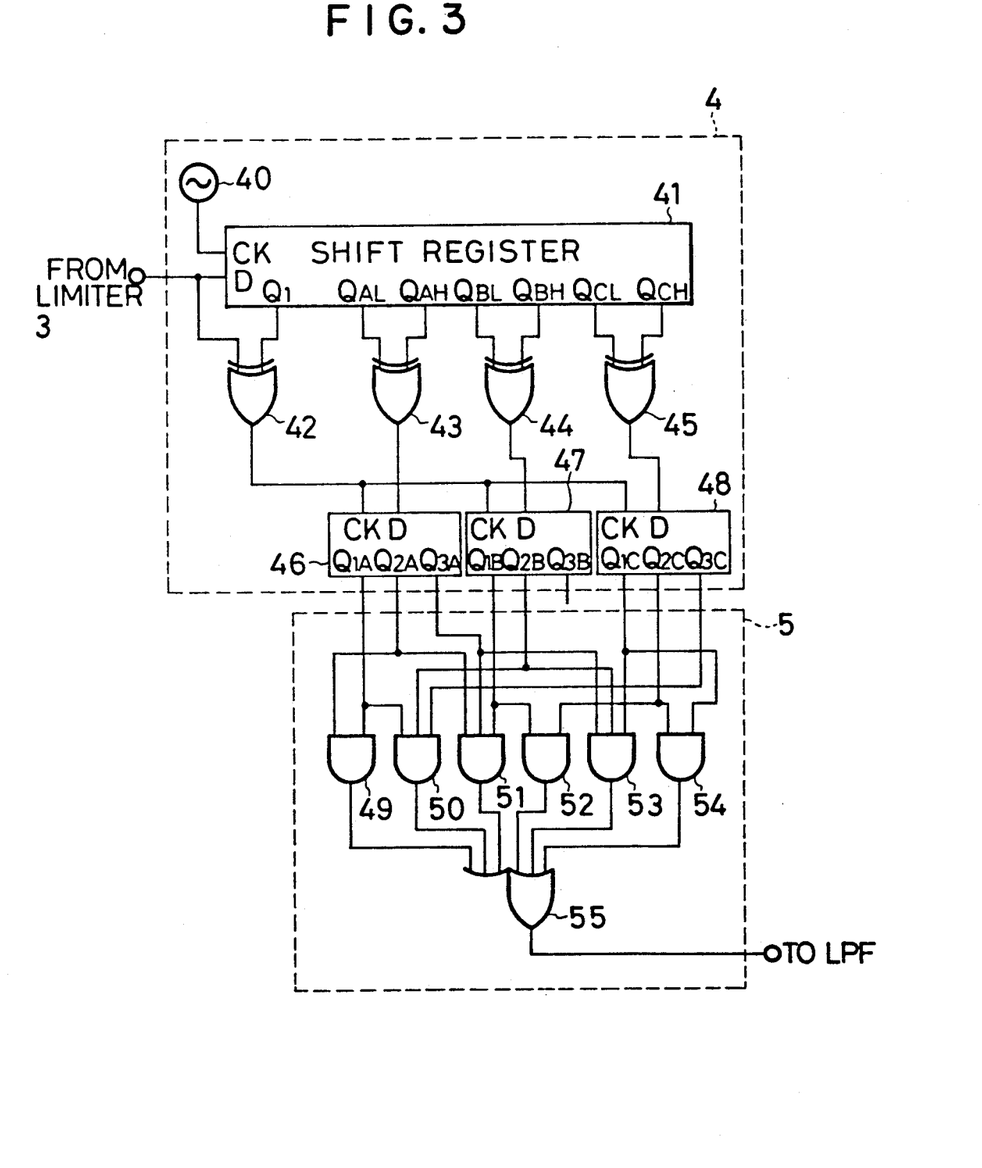
FIG. 3 is a more detailed block diagram illustrating the transition interval decision and memorizing circuit and MSK decision circuit in FIG. 1.

The limiter output signal 12 is fed to the transition interval decision and memorizing circuit 4, which decides whether intervals between transitions of the limiter output signal fall into the windows $T_A$, $T_B$, and $T_C$ and stores the decision results. An example of the structure of the transition interval decision and memorizing circuit 4 is shown in FIG. 3, which also shows an example of the structure of the MSK decision circuit 5. These structures will be described next.

The transition interval decision and memorizing circuit 4, shown in the upper part of FIG. 3, comprises a clock oscillator 40, a first shift register 41, first to fourth exclusive-OR (EXOR) gates 42 to 45, and second to fourth shift registers 46 to 48.

The first shift register 41 receives the limiter output signal 12 and, driven by the clock oscillator 40, shifts the limiter output signal by amounts equivalent to $t_{d1}$, $t_{AL}$, $t_{AH}$, $t_{BL}$, $t_{BH}$, $t_{CL}$, and $t_{CH}$, where $t_{d1}$ is one clock cycle of the clock oscillator 40 and $t_{AL}$, $t_{AH}$, $t_{BL}$, $t_{BH}$, $t_{CL}$, and $t_{CH}$ are the lower and upper limits of the windows $T_A$, $T_B$ and $T_C$ as described previously. In this way the first shift register 41 generates shifted signals $Q_1$, $Q_{AL}$, $Q_{AH}$, $Q_{BL}$, $Q_{BH}$, $Q_{CL}$, and $Q_{CH}$ identical to the limiter output signal 12 with delay times of $t_{d1}$, $t_{AL}$, $t_{AH}$, $t_{BL}$, $t_{BH}$, $t_{CL}$, and $t_{CH}$, respectively.

The first EXOR gate 42 exclusively ORs the limiter output signal 12 and the shifted limiter output signal $Q_1$. The output of the EXOR gate 42 comprises a pulse of width $t_{d1}$ at each high-to-low or low-to-high transition of the limiter output signal 12, as illustrated at H in FIG. 2. These pulses will be called transition pulses below.

The second EXOR gate 43 exclusively ORs the shifted signals $Q_{AL}$ and $Q_{AH}$, the third EXOR gate 44 exclusively ORs the shifted signals $Q_{BL}$ and $Q_{BH}$, and the fourth EXOR gate 45 exclusively ORs the shifted signals $Q_{CL}$ and $Q_{CH}$. The EXOR gates 43 to 45 produce pulse signals that are high during the windows $T_A$, $T_B$, and $T_C$ measured from each transition point in the limiter output signal 12. For example, the output waveform of the second EXOR gate 43, shown at G in FIG. 2, comprises pulses defining the $T_A$ window after each transition pulse at H in FIG. 2.

The second to fourth shift registers 46 to 48 are clocked by the transition pulses output by the first EXOR gate 42, which are applied to their clock (CK) input terminals. The second shift register 46 stores and shifts the output of the second EXOR gate 43, which it receives at its data (D) input terminal. The third and fourth shift registers 47 and 48 similarly store and shift the output of the third and fourth EXOR gates 44 and 45.

The transition interval decision and memorizing circuit 4 in FIG. 3 stores decision results for the three most recent intervals between transitions of the limiter output signal 12, and provides output signals indicating these decision results. The decision result for the most recent interval is provided by first-stage output signals $Q_{1A}$ from the second shift register 46, $Q_{1B}$ from the third shift register 47, and $Q_{1C}$ from the fourth shift register 48. Decision results for the preceding two intervals are similarly provided by second-stage output signals $Q_{2A}$, $Q_{2B}$, and $Q_{2C}$, and by third stage output signals $Q_{3A}$, $Q_{3B}$, and $Q_{3C}$.

If the interval between two transition points in the limiter output signal 12 is approximately $t_A$, for example, the transition pulse output by the first EXOR gate 42 at the second transition point coincides with high output from the second EXOR gate 43 representing the $T_A$ window following the first transition point. This high output is stored in the first position in the second shift register 46, creating a high first-stage output $Q_{1A}$. Similarly, if the interval falls in the window $T_B$ or $T_C$, the first-stage output $Q_{1B}$ or $Q_{1C}$ goes high. If the interval does not fall in any of the three windows, all three first-stage outputs $Q_{1A}$, $Q_{1B}$, and $Q_{1C}$ are low.

At each new transition of the limiter output signal 12, the transition pulse output from the first EXOR gate 42 clocks the shift registers 46, 47, and 48, causing the old first-stage outputs $Q_{1A}$, $Q_{1B}$, and $Q_{1C}$ to become new second-stage outputs $Q_{2A}$, $Q_{2B}$, and $Q_{2C}$, while the old second-stage outputs $Q_{2A}$, $Q_{2B}$, and $Q_{2C}$ become new third-stage outputs $Q_{3A}$, $Q_{3B}$, and $Q_{3C}$. Thus the outputs $Q_{2A}$, $Q_{2B}$, and $Q_{2C}$ identify the second-most-recent transition interval as being in window $T_A$, $T_B$, $T_C$, or none of these, while the outputs $Q_{3A}$, $Q_{3B}$, and $Q_{3C}$ give this information about the third-most-recent transition interval.

Waveforms of the $Q_{1A}$ and $Q_{2A}$ outputs of the second shift register 46 are shown at I and J in FIG. 2 as examples. The waveform of the output $Q_{1B}$ of the third shift register 47 is shown at K.

The order in which the intervals $t_A$, $t_B$, and $t_C$ between transitions in the limiter output signal 12 appear when an MSK signal is input at the input terminal 1 in FIG. 1 normally exhibits one of the patterns listed next:

(1) $t_A$ preceded by $t_A$
(2) $t_A$ preceded by $t_B$ preceded by $t_C$
(3) $t_B$ preceded by $t_A$ preceded by $t_A$
(4) $t_B$ preceded by $t_C$
(5) $t_C$ preceded by $t_B$ preceded by $t_A$ (6) $t_C$ preceded by $t_C$ If first-stage, second-stage, and third-stage outputs of the shift registers 46, 47, and 48 display one of these six patterns, the signal input at the input terminal 1 is likely to be an MSK signal. If none of these patterns is displayed, the input signal is presumably noise: for example, a voice signal sharing the same frequency band as the MSK signal.

The MSK decision circuit 5 decides between MSK signal input and noise input by performing logic operations on the outputs from the shift registers 46, 47, and 48. With reference again to FIG. 3, the MSK decision circuit 5 comprises AND gates 49, 50, 51, 52, 53, and 54 and an OR gate 55. The AND gate 49 receives outputs $Q_{1A}$ and $Q_{2A}$, corresponding to pattern (1). The AND gate 50 receives outputs $Q_{1A}$, $Q_{2B}$, and $Q_{3C}$, corresponding to pattern (2). The AND gate 51 receives outputs $Q_{1B}$, $Q_{2A}$, and $Q_{3A}$, corresponding to pattern (3). The AND gate 52 receives outputs $Q_{1B}$ and $Q_{2C}$, corresponding to pattern (4). The AND gate 53 receives outputs $Q_{1C}$, $Q_{2B}$, and $Q_{3A}$, corresponding to pattern (5). The AND gate 54 receives outputs $Q_{1C}$ and $Q_{2C}$, corresponding to pattern (6). The outputs of the AND gates 49 to 54 are input to an OR gate 55, the output of which goes high when any of patterns (1) to (6) appears.

The output of the OR gate 55 becomes the MSK decision signal 13 that is sent to the first LPF 6 in FIG. 1. The first LPF 6 averages the MSK decision output 13 over a certain time period so that the MSK signal detector will not be deceived by chance coincidences between noise input and one of the patterns (1) to (6), or momentary departures of an MSK signal from these patterns. The first LPF 6 can be, for example, a well-known moving-average circuit that operates directly on the digital output of the OR gate 55.

The thresholding circuit 7 compares the output of the first LPF 6 with a threshold level and generates the MSK detect signal 14. If the LPF output exceeds the threshold, the MSK detect signal 14 goes high, for example, indicating presence of an MSK signal at the input terminal 1. If the LPF output is below the threshold, the MSK detect signal 14 goes low, for example, indicating noise.

When the input is noise, the interval between transition points of the limiter output signal 12 usually does not fall into any of the windows $T_A$, $T_B$, and $T_C$, so all the first-stage outputs $Q_{1A}$, $A_{1B}$, and $Q_{1C}$ of the shift registers 46 to 48 are low and the MSK decision signal 13 is low. Even when the interval between transitions hits one of the windows $T_A$, $T_B$, and $T_C$ by chance, it has a low probability of duplicating any of the patterns (1) to (6), so most of the time the outputs of the AND gates 49 to 54 are all low, and again the MSK decision output 13 is low. Occasionally a noise signal may match one of the patterns (1) to (6), but these relatively rare coincidences are eliminated by the first LPF 6 and the thresholding circuit 7. If the threshold level in the thresholding circuit 7 is appropriately set, the MSK detect signal 14 will indicate only genuine MSK input at the input terminal 1.

Although the delay detector 9 in FIG. 1 is not strictly speaking part of the MSK signal detector, the shift registers in the transition interval decision and memorizing circuit 4 shown in FIG. 3 can also be utilized as components of the delay detector 9 to create an efficient circuit configuration.

Figure 4L:
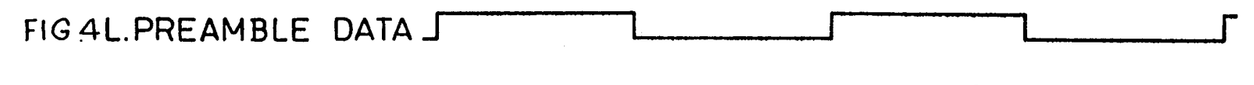
Figure 4M:
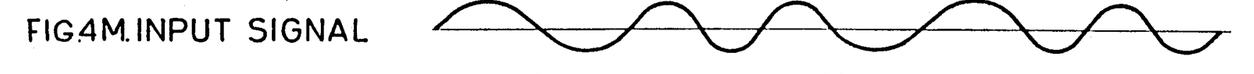
Figure 4N:
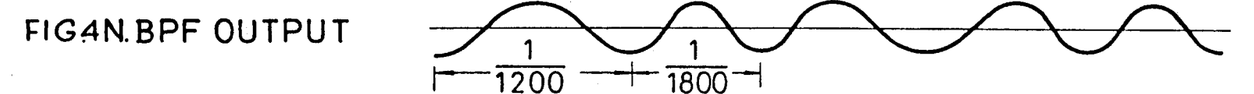
Figure 4O:
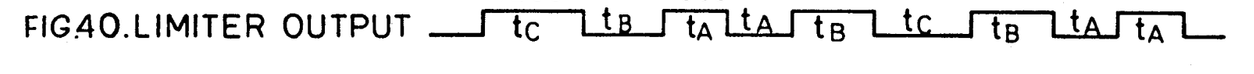
Figure 4P:
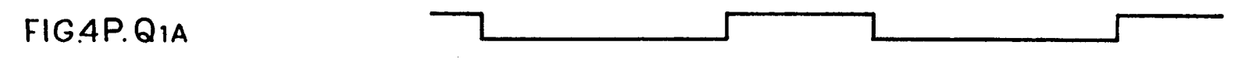
Figure 4Q:
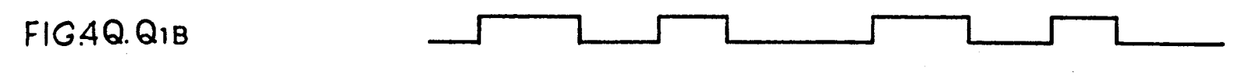
Figure 4R:
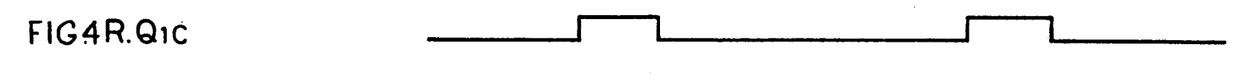
Figure 4S:
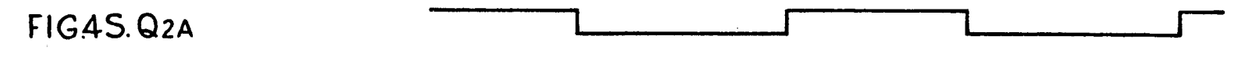
Figure 4T:
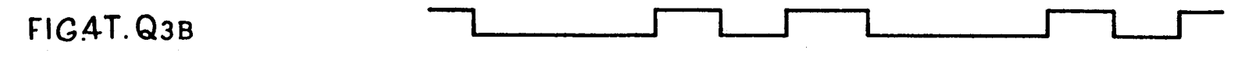

A second novel MSK signal detector will now be described with reference to FIGS. 1, 4, and 5. The purpose of this MSK signal detector is to detect a preamble signal, also called a bit synchronization signal, which may be placed at the beginning of a digital signal stream to facilitate clock regeneration. A preamble represents an alternating string of 1s and 0s (101010 ...).

When such a preamble signal is used in multi-channel access system radio (MCA), for example, the receiving station must detect the preamble signal quickly. The cutoff frequency of the first LPF 6 in FIG. 1 must therefore be raised to speed up the filter response. If the first LPF 6 comprises a moving-average circuit, the cutoff frequency can be raised and the response quickened by shortening the averaging time.

With the MSK decision circuit 5 shown in FIG. 3, however, the shortened averaging time may be insufficient to prevent noise input from exceeding the threshold in the thresholding circuit 7 and triggering a false MSK detect signal. In the second novel MSK signal detector, accordingly, the MSK decision circuit 5 is replaced by a preamble decision circuit which will be described below. Otherwise, the second novel MSK signal detector has the same structure as the first novel MSK signal detector shown in FIG. 1, except that the cutoff frequency of the first LPF 6 is higher.

With reference to FIG. 4, a preamble sequence is shown at L, the corresponding MSK input signal at M, the output of the BPF 2 at N, and the limiter output signal 12 at 0. The order of appearance of intervals between transitions in the limiter output signal 12 shown at 0 is $t_C$, $t_B$, $t_A$, $t_A$, $t_B$, $t_C$, $t_B$, $t_A$, $t_A$, .... In general, when an MSK-modulated preamble signal is received at the input terminal 1 in FIG. 1, the order of appearance of $t_A$, $t_B$, and $t_C$ will display substantially this pattern, which can be broken down into the following five patterns (7) to (11):

(7) $t_A$ preceded by $t_A$ preceded by $t_B$
(8) $t_A$ preceded by $t_B$ preceded by $t_C$
(9) $t_B$ preceded by $t_A$ preceded by $t_A$
(10) $t_B$ preceded by $t_C$
(11) $t_C$ preceded by $t_B$ preceded by $t_A$ The preamble decision circuit 60 identifies a preamble signal by performing logic operations on the previously-described outputs $Q_{1A}$ to $Q_{3C}$ of the transition interval decision and memorizing circuit 4. In FIG. 4 the first-stage outputs $Q_{1A}$, $Q_{1B}$, and $Q_{1C}$ of the transition interval decision and memorizing circuit 4 are illustrated at P, Q, and R, respectively, the second-stage output $Q_{2A}$ is illustrated at S, and the third-stage output $Q_{3B}$ is illustrated at T.

Figure 4U:
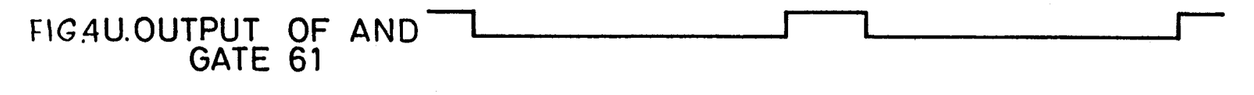
Figure 5:
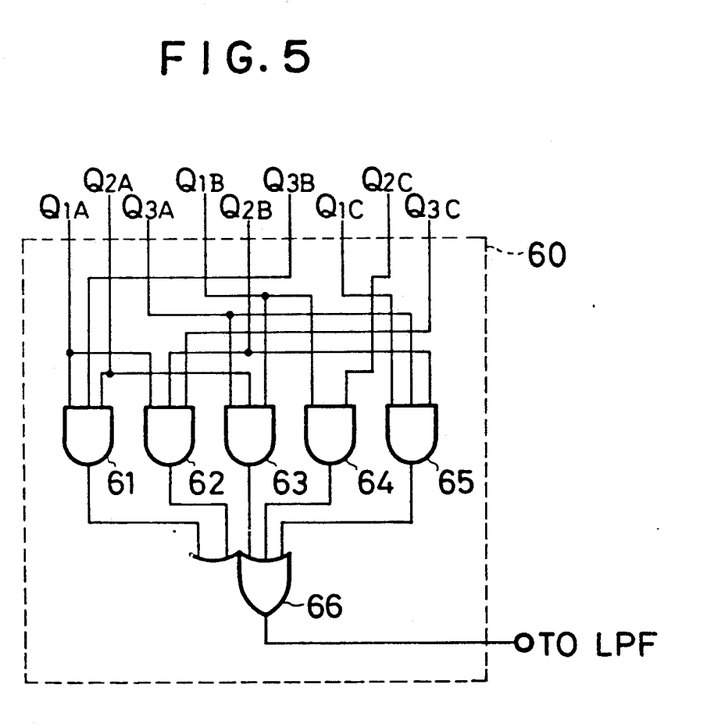
FIG. 5 is a block diagram illustrating a preamble decision circuit used in the second novel MSK signal detector.

With reference to FIG. 5, the preamble decision circuit 60 comprises AND gates 61, 62, 63, 64, and 65 and an OR gate 66. The AND gate 61 receives outputs $Q_{1A}$, $Q_{2A}$, and $Q_{3B}$, corresponding to pattern (7). The AND gate 62 receives outputs $Q_{1A}$, $Q_{2B}$, and $Q_{3C}$, corresponding to pattern (8). The AND gate 63 receives outputs $Q_{1B}$, $Q_{2A}$, and $Q_{3A}$, coresponding to pattern (9). The AND gate 64 receives outputs $Q_{1B}$ and $Q_{2C}$, corresponding to pattern (10). The AND gate 65 receives outputs $Q_{1C}$, $Q_{2B}$, and $Q_{3A}$, corresponding to pattern (11). The outputs of the AND gates 61 to 65 are input to an OR gate 66, the output of which goes high when any of patterns (7) to (11) appears. The output of the AND gate 61 is illustrated at U in FIG. 4.

In other respects the operation of the second novel MSK signal detector is similar to the operation of the first novel MSK signal detector; further description will hence be omitted. The preamble decision circuit 60 has more stringent decision criteria than the MSK decision circuit 5, because patterns (7) to (11) form a subset of patterns (1) to (6), so the preamble decision circuit 60 produces false high outputs during noise input less often. Thus the cutoff frequency of the first LPF 6 can be safely raised to obtain a faster response without causing the thresholding circuit 7 to output false MSK detect signals.

The first two novel MSK signal detectors can be combined to create an MSK signal detector that responds to general MSK signals in the same way as the first novel MSK signal detector, but also identifies preamble signals quickly. Such an MSK signal detector will be described next.

Figure 6:
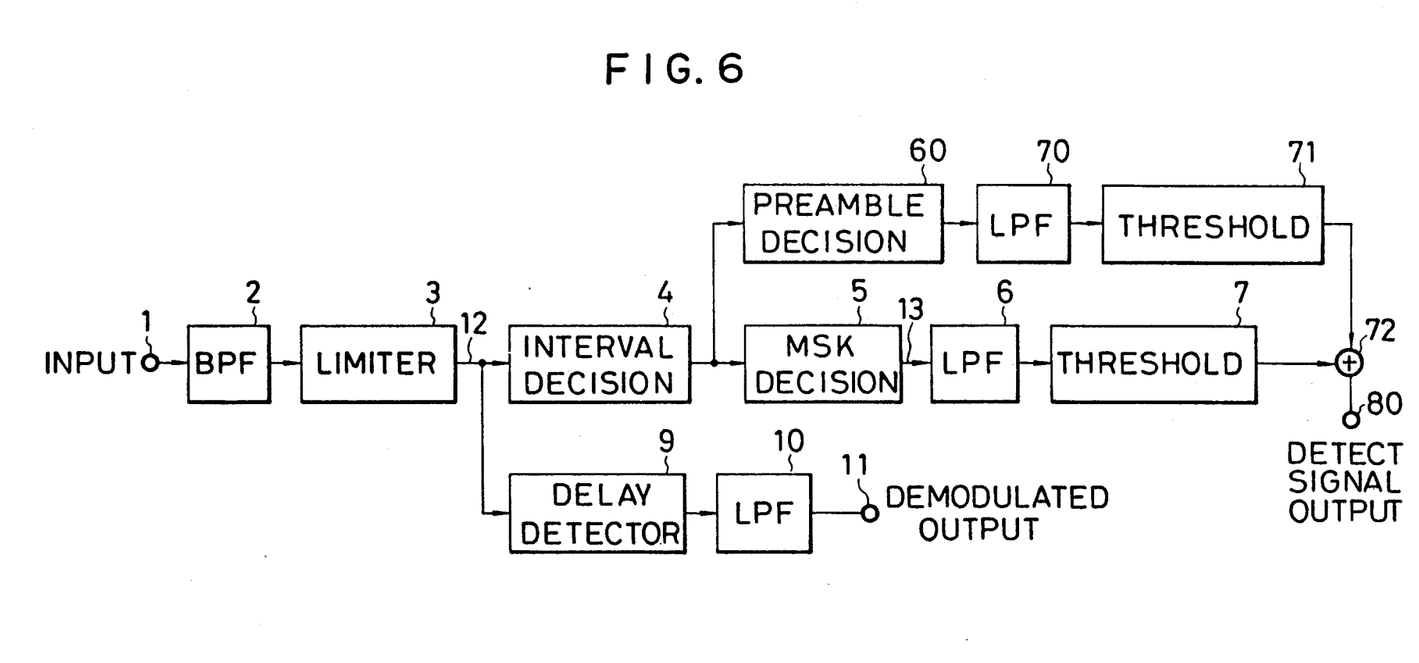
FIG. 6 is a block diagram illustrating a third novel MSK signal detector.

With reference to FIG. 6, a third novel MSK signal detector comprises the same input terminal 1, BPF 2, limiter 3, transition interval decision and memorizing circuit 4, MSK decision circuit 5, first LPF 6, thresholding circuit 7, delay detector 9, third LPF 10, and second output terminal 11 as the first novel MSK signal detector shown in FIG. 1.

The outputs of the transition interval decision and memorizing circuit 4 are provided to both the MSK decision circuit 5 and a preamble decision circuit 60 having, for example, the structure already described in FIG. 5. The preamble decision signal output by the preamble decision circuit 60 is fed to a second LPF 70 having a higher cutoff frequency than the first LPF 6. The first and second LPFs 6 and 70 can be moving-average circuits, with the second LPF 70 having the shorter averaging time. The output of the second LPF 70 is fed to a preamble thresholding circuit 71 which is identical in function to the thresholding circuit 7, although possibly using a different threshold value, and generates a preamble detect signal. The two detect signals generated by the thresholding circuit 7 and the preamble thresholding circuit 71 are combined in an adder 72, and output as an MSK detect signal at an output terminal 80. The adder 72 can be an OR gate, for example, or simply a wired-OR connection of the signal lines.

When an MSK-modulated preamble signal is received at the input terminal 1, it will quickly be detected by the preamble decision circuit 60, second LPF 70, and preamble thresholding circuit 71, and an MSK detect signal indicating the MSK input will be output from the preamble thresholding circuit 71 via the adder 72 at the first output terminal 80. General MSK signals following the preamble may not be detected on this path, due to the stringent decision conditions in the preamble decision circuit 60, but such general MSK signals will be detected by the MSK decision circuit 5, the first LPF 6, and the thresholding circuit 7, and again an MSK detect signal will be output via the adder 72 at the first output terminal 80. Thus the novel MSK signal detector illustrated in FIG. 6 detects all MSK input signals, with the added merit of quick response to preamble signals.

In the novel MSK signal detectors illustrated in FIGS. 1 to 6, all circuits downstream of the limiter 3 can be digital, hence they can be implemented in a small space on a semiconductor chip. The required number of operational amplifiers is greatly reduced, so power dissipation is significantly lower than in the prior art. In addition, quick response to preamble signals can be achieved without incurring false detection due to noise by providing a preamble decision circuit with decision criteria tailored to a preamble signal.

The scope of this invention is not limited to the structures shown in the drawings, but includes many modifications and variations that will be apparent to one skilled in the art. In particular, the transition interval decision and memorizing circuit 4, the MSK decision circuit 5, and the preamble decision circuit 60 need not be structured as illustrated in FIGS. 3 and 5; other structures are possible if they provide the same function.

What is claimed is:

1. A minimum shift keying (MSK) signal detector comprising:
    a limiter for limiting the amplitude of an input signal and generating a limiter output signal with high and low levels;
    a transition interval decision and memorizing circuit for deciding whether intervals between high-to-low and low-to-high transitions of said limiter output signal fall into a first window centered at the half-period of an MSK space frequency, a third window centered at the half-period of an MSK mark frequency, or a second window disposed midway between said first and third windows, and storing decision results;
    an MSK decision circuit for testing the pattern of said decision results and generating an MSK decision signal indicating whether the pattern of said decision results matches a pattern appearing when the input signal is an MSK signal;
    a low-pass filter for averaging said MSK decision signal; and
    a thresholding circuit for generating an MSK detect signal indicating whether or not the output of said low-pass filter exceeds a threshold value.

2. The MSK signal detector of claim 1, wherein said transition interval decision and memorizing circuit stores decision results for the three most recent intervals between transitions of said limiter output signal.

3. The MSK signal detector of claim 2, wherein said MSK decision circuit tests whether the pattern of said decision results matches any of the following patterns:
    said first window preceded by said first window;
    said first window preceded by said second window preceded by said third window;
    said second window preceded by said first window preceded by said first window;
    said second window preceded by said third window;
    said third window preceded by said second window preceded by said first window; and
    said third window preceded by said third window.

4. The MSK signal detector of claim 1, wherein said transition interval decision and memorizing circuit comprises:
    a clock oscillator;
    a first shift register, driven by said clock oscillator, for shifting said limiter output signal by amounts equivalent to one clock cycle and to upper and lower limits of said first, second, and third windows;
    a first EXOR gate for exclusively-ORing said limiter output signal and said limiter output signal shifted by one clock cycle;
    a second EXOR gate for exclusively-ORing said limiter output signal shifted by amounts equivalent to the upper and lower limits of said first window;
    a third EXOR gate for exclusively-ORing said limiter output signal shifted by amounts equivalent to the upper and lower limits of said second window;

a fourth EXOR gate for exclusively-ORing said limiter output signal shifted by amounts equivalent to the upper and lower limits of said third window;

a second shift register, clocked by the output of said first EXOR gate, for storing and shifting the output of said second EXOR gate;

a third shift register, clocked by the output of said first EXOR gate, for storing and shifting the output of said third EXOR gate; and a fourth shift register, clocked by the output of said first EXOR gate, for storing and shifting the output of said fourth EXOR gate.

5. The MSK signal detector of claim 4, wherein each of said second, third, and fourth shift registers produces first-stage, second-stage, and third-stage outputs.

6. The MSK signal detector of claim 5, wherein said MSK decision circuit comprises:

a first AND gate for ANDing the first-stage and second-stage outputs of said second shift register;

a second AND gate for ANDing the first-stage output of said second shift register, the second-stage output of said third shift register, and the third-stage output of said fourth shift register;

a third AND gate for ANDing the first-stage output of said third shift register, the second-stage output of said second shift register, and the third-stage output of said second shift register;

a fourth AND gate for ANDing the first-stage output of said third shift register and the second-stage output of said fourth shift register;

a fifth AND gate for ANDing the first-stage output of said fourth shift register, the second-stage output of said third shift register, and the third-stage output of said second shift register;

a sixth AND gate for ANDing the first-stage and second-stage outputs of said fourth shift register; and an OR gate for ORing the outputs of said first AND gate, said second AND gate, said third AND gate, said fourth AND gate, said fifth AND gate and said sixth AND gate.

7. A minimum shift keying (MSK) signal detector comprising:

a limiter for limiting the amplitude of an input signal and generating a limiter output signal with high and low levels;

a transition interval decision and memorizing circuit for deciding whether the interval between high-to-low and low-to-high transitions in said limiter output signal falls into a first window centered at the half-period of an MSK signal representing a space, a third window centered at the half-period of an MSK signal representing a mark, or a second window disposed midway between said first and third windows, and storing decision results;

a preamble decision circuit for testing the pattern of said decision results and generating a preamble decision signal indicating whether the pattern of said decision results matches a pattern appearing when the input signal is an MSK-modulated preamble signal;

a low-pass filter for averaging said preamble decision signal; and a thresholding circuit for generating an MSK detect signal indicating whether or not the output of said low-pass filter exceeds a threshold value.

8. The MSK signal detector of claim 7, wherein said transition interval decision and memorizing circuit stores decisions for the three most recent intervals between transitions of said limiter output signal.

9. The MSK signal detector of claim 8, wherein said preamble decision circuit tests whether the pattern of said decision results matches any of the following patterns:

said first window preceded by said first window preceded by said second window;

said first window preceded by said second window preceded by said third window;

said second window preceded by said first window preceded by said first window;

said second window preceded by said third window; and said third window preceded by said second window preceded by said first window.

10. The MSK signal detector of claim 7, wherein said transition interval decision and memorizing circuit comprises:

a clock oscillator;

a first shift register, driven by said clock oscillator, for shifting said limiter output signal by amounts equivalent to one clock cycle and to upper and lower limits of said first, second, and third windows;

a first EXOR gate for exclusively-ORing said limiter output signal and said limiter output signal shifted by one clock cycle;

a second EXOR gate for exclusively-ORing said limiter output signal shifted by amounts equivalent to the upper and lower limits of said first window;

a third EXOR gate for exclusively-ORing said limiter output signal shifted by amounts equivalent to the upper and lower limits of said second window;

a fourth EXOR gate for exclusively-ORing said limiter output signal shifted by amounts equivalent to the upper and lower limits of said third window;

a second shift register, clocked by the output of said first EXOR gate, for storing and shifting the output of said second EXOR gate;

a third shift register, clocked by the output of said first EXOR gate, for storing and shifting the output of said third EXOR gate; and a fourth shift register, clocked by the output of said first EXOR gate, for storing and shifting the output of said fourth EXOR gate.

11. The MSK signal detector of claim 10, wherein each of said second, third, and fourth shift registers produces first-stage, second-stage, and third-stage outputs.

12. The MSK signal detector of claim 11, wherein said preamble decision circuit comprises:

a first AND gate for ANDing the first-stage output of said second shift register, the second-stage output of said second shift register, and the third-stage output of said third shift register;

a second AND gate for ANDing the first-stage output of said second shift register, the second-stage output of said third shift register, and the third-stage output of said fourth shift register;

a third AND gate for ANDing the first-stage output of said third shift register, the second-stage output of said second shift register, and the third-stage output of said second shift register;

a fourth AND gate for ANDing the first-stage output of said third shift register and the second-stage output of said fourth shift register;

a fifth AND gate for ANDing the first-stage output of said fourth shift register, the second-stage output of said third shift register, and the third-stage output of said second shift register; and an OR gate for ORing the outputs of said first AND gate, said second AND gate, said third AND gate, said fourth AND gate and said fifth AND gate.

13. A minimum shift keying (MSK) signal detector comprising:

a limiter for limiting the amplitude of an input signal and generating a limiter output signal with high and low levels;

a transition interval decision and memorizing circuit for deciding whether the interval between high-to-low and low-to-high transitions in said limiter output signal falls into a first window centered at the half-period of an MSK signal representing a space, a third window centered at the half-period of an MSK signal representing a mark, or a second window disposed midway between said first and third windows, and storing decision results;

an MSK decision circuit for testing the pattern of said decision results and generating an MSK decision signal indicating whether the pattern of said decision results matches a pattern appearing when the input signal is an MSK signal;

a first low-pass filter for averaging said MSK decision signal;

a thresholding circuit for generating an MSK detect signal indicating whether or not the output of said first low-pass filter exceeds a threshold value;

a preamble decision circuit for testing the pattern of said decision results and generating a preamble decision signal indicating whether the pattern of said decision results matches a pattern appearing when the input signal is an MSK-modulated preamble signal;

a second low-pass filter, having a higher cutoff frequency than said first low-pass filter, for averaging said preamble decision signal;

a preamble thresholding circuit for generating a preamble detect signal indicating whether or not the output of said second low-pass filter exceeds a threshold value; and an adder for combining said MSK detect signal and said preamble detect signal.

14. The MSK signal detector of claim 13, wherein said transition interval decision and memorizing circuit stores decisions for the three most recent intervals between transitions of said limiter output signal.

15. The MSK signal detector of claim 14, wherein said MSK decision circuit tests whether the pattern of said decision results matches any of the following patterns:

said first window preceded by said first window;
said first window preceded by said second window preceded by said third window;
said second window preceded by said first window preceded by said first window;
said second window preceded by said third window;
said third window preceded by said second window preceded by said first window; and
said third window preceded by said third window.

16. The MSK signal detector of claim 14, wherein said preamble decision circuit tests whether the pattern of said decision results matches any of the following patterns:

said first window preceded by said first window preceded by said second window;
said first window preceded by said second window preceded by said third window;
said second window preceded by said first window preceded by said first window;
said second window preceded by said third window; and
said third window preceded by said second window preceded by said first window.

17. The MSK signal detector of claim 13, wherein said transition interval decision and memorizing circuit comprises:

a clock oscillator;

a first shift register, driven by said clock oscillator, for shifting said limiter output signal by amounts equivalent to one clock cycle and to upper and lower limits of said first, second, and third windows;

a first EXOR gate for exclusively-ORing said limiter output signal and said limiter output signal shifted by one clock cycle;

a second EXOR gate for exclusively-ORing said limiter output signal shifted by amounts equivalent to the upper and lower limits of said first window;

a third EXOR gate for exclusively-ORing said limiter output signal shifted by amounts equivalent to the upper and lower limits of said second window;

a fourth EXOR gate for exclusively-ORing said limiter output signal shifted by amounts equivalent to the upper and lower limits of said third window;

a second shift register, clocked by the output of said first EXOR gate, for storing and shifting the output of said second EXOR gate;

a third shift register, clocked by the output of said first EXOR gate, for storing and shifting the output of said third EXOR gate; and a fourth shift register, clocked by the output of said first EXOR gate, for storing and shifting the output of said fourth EXOR gate.

18. The MSK signal detector of claim 17, wherein each of said second, third, and fourth shift registers produces first-stage, second-stage, and third-stage outputs.

19. The MSK signal detector of claim 18, wherein said MSK decision circuit comprises:

a first AND gate for ANDing the first-stage and second-stage outputs of said second shift register;

a second AND gate for ANDing the first-stage output of said second shift register, the second-stage output of said third shift register, and the third-stage output of said fourth shift register;

a third AND gate for ANDing the first-stage output of said third shift register, the second-stage output of said second shift register, and the third-stage output of said second shift register;

a fourth AND gate for ANDing the first-stage output of said third shift register and the second-stage output of said fourth shift register;

a fifth AND gate for ANDing the first-stage output of said fourth shift register, the second-stage output of said third shift register, and the third-stage output of said second shift register; and a sixth AND gate for ANDing the first-stage and second-stage outputs of said fourth shift register; and an OR gate for ORing the outputs of said first AND gate, said second AND gate, said third AND gate, said fourth AND gate, said fifth AND gate, and said sixth AND gate.

20. The MSK signal detector of claim 19, wherein said preamble decision circuit comprises:

a seventh AND gate for ANDing the first-stage output of said second shift register, the second-stage output of said second shift register, and the third-stage output of said third shift register;

an eighth AND gate for ANDing the first-stage output of said second shift register, the second-stage output of said third shift register, and the third-stage output of said fourth shift register;

a ninth AND gate for ANDing the first-stage output of said third shift register, the second-stage output of said second shift register, and the third-stage output of said second shift register;

a tenth AND gate for ANDing the first-stage output of said third shift register and the second-stage output of said fourth shift register;

an eleventh AND gate for ANDing the first-stage output of said fourth shift register, the second-stage output of said third shift register, and the third-stage output of said second shift register; and an OR gate for ORing the outputs of said seventh AND gate, said eighth AND gate, said ninth AND gate, said tenth AND gate and said eleventh AND gate.

21. A minimum shift keying (MSK) signal analysis circuit comprising:

an input circuit coupled to receive input signals;

an MSK signal detector responsively coupled to said input circuit and producing derived signals based on the input signals and providing an output signal indicating that an MSK signal has been detected;

a demodulator responsively coupled to said input circuit for providing a demodulated MSK output signal;

the MSK detector including logic circuits for determining whether said derived signals fall within first, second or third timing intervals.

* * * * *